(12) United States Patent
Cheriton

(10) Patent No.: US 11,232,026 B2
(45) Date of Patent: Jan. 25, 2022

(54) DEFERRED DESTRUCTION FOR EFFICIENT RESOURCE RECLAMATION

(71) Applicant: OptumSoft, Inc., Menlo Park, CA (US)

(72) Inventor: David R. Cheriton, Palo Alto, CA (US)

(73) Assignee: OptumSoft, Inc., Menlo Park, CA (US)

( * ) Notice: Subject to any disclaimer, the term of this patent is extended or adjusted under 35 U.S.C. 154(b) by 0 days.

(21) Appl. No.: 16/509,259

(22) Filed: Jul. 11, 2019

(65) Prior Publication Data

US 2020/0104255 A1  Apr. 2, 2020

Related U.S. Application Data

(63) Continuation of application No. 14/640,868, filed on Mar. 6, 2015, now Pat. No. 10,437,720.

(60) Provisional application No. 61/951,993, filed on Mar. 12, 2014, provisional application No. 61/955,096, filed on Mar. 18, 2014.

(51) Int. Cl.
*G06F 12/02* (2006.01)
*G06F 11/14* (2006.01)

(52) U.S. Cl.
CPC ...... *G06F 12/0261* (2013.01); *G06F 11/1438* (2013.01)

(58) Field of Classification Search
CPC .............. G06F 12/0261; G06F 11/1438
See application file for complete search history.

(56) References Cited

U.S. PATENT DOCUMENTS

| | | | |
|---|---|---|---|
| 4,695,949 A * | 9/1987 | Thatte | G06F 12/0261 |
| 4,853,842 A | 8/1989 | Thatte | |
| 5,355,469 A | 10/1994 | Sparks | |
| 5,398,334 A | 3/1995 | Topka | |
| 5,485,613 A | 1/1996 | Engelstad | |
| 5,721,918 A | 2/1998 | Nilsson | |
| 5,765,174 A * | 6/1998 | Bishop | G06F 12/0261 |
| 5,873,097 A * | 2/1999 | Harris | G06F 16/2308 |
| 6,161,219 A * | 12/2000 | Ramkumar | G06F 11/1438 |
| | | | 714/E11.209 |
| 6,304,949 B1 * | 10/2001 | Houlsdworth | G06F 12/0253 |
| | | | 707/999.202 |
| 6,343,296 B1 | 1/2002 | Lakhamraju | |
| 6,363,403 B1 | 3/2002 | Roy | |

(Continued)

FOREIGN PATENT DOCUMENTS

| | | | | |
|---|---|---|---|---|
| EP | 642686 | | 3/1995 | |
| EP | 1387273 A2 * | | 2/2004 | G06F 9/30174 |

OTHER PUBLICATIONS

English Translation of JAVA, Understanding the JVM: Advanced Features and Best Practices, Second Edition, Jun. 30, 2013.

(Continued)

*Primary Examiner* — Ken Hoang
(74) *Attorney, Agent, or Firm* — Van Pelt, Yi & James LLP

(57) ABSTRACT

Memory reclamation includes executing a process that has a plurality of objects, the objects being accessible via a plurality of references, at least some of the plurality of references being transient references, at least some of the plurality of references being persistent references; reaching a reclamation point at which a process state has no transient references, or has transient references only at known locations; and at the reclamation point, destructing objects that have no persistent references and no transient references.

16 Claims, 15 Drawing Sheets

(56) References Cited

U.S. PATENT DOCUMENTS

| | | |
|---|---|---|
| 6,381,738 B1 | 4/2002 | Choi |
| 6,473,773 B1 | 10/2002 | Cheng |
| 7,263,700 B1 | 8/2007 | Bacon |
| 7,404,182 B1 | 7/2008 | Garthwaite |
| 9,311,229 B2 | 4/2016 | Chishtie |
| 9,507,713 B1 | 11/2016 | Payer |
| 2002/0073283 A1 | 6/2002 | Lewis |
| 2002/0194421 A1 | 12/2002 | Berry |
| 2003/0221073 A1 | 11/2003 | Saltz |
| 2004/0168030 A1* | 8/2004 | Traversal ............ G06F 9/45504 711/133 |
| 2004/0186906 A1* | 9/2004 | Torrant ................... H04L 47/70 709/225 |
| 2005/0129235 A1 | 6/2005 | Little |
| 2006/0080364 A1 | 4/2006 | Lake |
| 2006/0173897 A1 | 8/2006 | Lee |
| 2007/0203960 A1 | 8/2007 | Guo |
| 2007/0282926 A1 | 12/2007 | Ben-Yehuda |
| 2009/0222802 A1 | 9/2009 | Dussud |
| 2009/0307431 A1 | 12/2009 | Garst, Jr. |
| 2009/0327373 A1 | 12/2009 | Chacko |
| 2010/0228796 A1 | 9/2010 | Goetz |
| 2011/0087634 A1 | 4/2011 | Gallaher |
| 2011/0276833 A1 | 11/2011 | Otenko |
| 2012/0239709 A1 | 9/2012 | Burka |
| 2012/0246204 A1* | 9/2012 | Nalla .................. G06F 12/0253 707/815 |
| 2013/0339643 A1 | 12/2013 | Tekade |
| 2014/0019668 A1 | 1/2014 | Das |
| 2014/0040327 A1 | 2/2014 | Onodera |
| 2014/0208323 A1 | 7/2014 | Goetz |
| 2015/0186266 A1 | 7/2015 | Schreter |
| 2015/0293816 A1* | 10/2015 | Ye ......................... G06F 16/284 707/643 |
| 2016/0147445 A1* | 5/2016 | Schreter ............. G06F 16/2282 707/601 |
| 2016/0147811 A1 | 5/2016 | Eluri |
| 2016/0147814 A1 | 5/2016 | Goel |
| 2017/0351606 A1 | 12/2017 | Chakrabarti |

OTHER PUBLICATIONS

Java, Understanding the JVM: Advanced Features and Best Practices, Second Edition, Jun. 30, 2013.

Luke Quinane, "An Examination of Deferred Reference Counting and Cycle Detection", Apr. 2004, The Department of Computer Science Australian National University, all pages.

McKenney et al., "Exploiting Deferred Destruction: An Analysis of Read-Copy-Update Techniques in Operating System Kernels", Jan. 3, 2005, Computer Science Department Portland State University, all pages.

Munro et al., Incremental Garbage Collection of a Persistent Object Store using PMOS, Jan. 1, 1998, Department of Computer Science, University of Massachusetts, all pages.

* cited by examiner

DEFERRED DESTRUCTION FOR EFFICIENT RESOURCE RECLAMATION

CROSS REFERENCE TO OTHER APPLICATIONS

This application is a continuation of co-pending U.S. patent application Ser. No. 14/640,868, entitled DEFERRED DESTRUCTION FOR EFFICIENT RESOURCE RECLAMATION filed Mar. 6, 2015 which is incorporated herein by reference for all purposes, which claims priority to U.S. Provisional Patent Application No. 61/951,993, entitled DEFERRED DESTRUCTION FOR EFFICIENT RESOURCE RECLAMATION filed Mar. 12, 2014 which is incorporated herein by reference for all purposes and also claims priority to U.S. Provisional Patent Application No. 61/955,096 entitled DEFERRED DESTRUCTION FOR EFFICIENT RESOURCE RECLAMATION filed Mar. 18, 2014 which is incorporated herein by reference for all purposes.

BACKGROUND OF THE INVENTION

In a computer system, memory is commonly partitioned into a multiplicity of objects, each object being a unit of memory allocation and reclamation. The memory used by an object is reclaimed when there are no references to this object. Further, there is often object-specific processing that needs to take place as part of freeing an object. For example, the object may refer to other objects and thus the object-specific processing needs to dereference any such referenced object, and further free the dereferenced object if it no longer has any references. Consequently, object destruction can potentially cause a cascade of other objects being freed and memory being reclaimed. The object-specific processing is specified by a function called a destructor in C++ and other languages. Consequently, it is common to refer to object destruction rather than memory reclamation, to capture both the object-specific reclamation-associated processing in the destructor as well as memory reclamation. How to adequately and efficiently perform object destruction within an application is a challenging problem.

In the past, programmers were expected to explicitly call a procedure, e.g., free or delete to invoke object destruction. This manual approach is error-prone and difficult, because it requires the programmer to know when there is no other reference to the object in any portion of the application. If the programmer-specified call causes an object to destruct while it still has references, a subsequent access to this freed portion of memory can cause the application to access random data, which can lead to catastrophic failure. On the other hand, if the programmer fails to cause an object to destruct when it should, the memory is typically lost for the lifetime of the application. Such memory leaks can cause the application to use an increasing amount of memory over time, often leading to failure. Moreover, an object that is not destructed in a timely manner may be holding other resources as well, such as locks, open files, and references to other objects, further wasting system resources. Finally, the manual approach can result in an object being freed a second time, also causing catastrophic program failure.

An alternative approach is to introduce a reference count variable in each object. This field is then incremented when a new reference to the object is created and decremented when a reference is removed. Then, when the reference count goes to zero, the object can be reclaimed. Languages such as C++ provide mechanisms, often referred to as smart pointer implementations, that semi-automatically implement this reference counting, thereby providing automatic reclamation of objects. One can also maintain explicit lists of the other objects referencing a given object, but this is even more costly than reference counting.

FIG. 1 is a data structure diagram illustrating an example of reference-counted objects. In this reference graph, an edge such as 101 represents a reference (e.g., a pointer, a handle, an identifier, an address, and/or another appropriate mechanism that facilitates the access of an object). For each object, the corresponding reference count value indicates the number of references to the object. For instance, object 104 has 3 references to it, namely by objects 102, 103, and 105.

The reference counting approach incurs a significant overhead because accurate reference counting of the objects needs to be maintained, and reference counting operations must be invoked each time an object is referenced or dereferenced. The overhead is particularly significant when the increment and decrement operations need to be atomic, as required in a multi-threaded environment, and thus require expensive hardware instructions such as memory fence operations. A further concern with reference counting is the unpredictable overhead that can occur on dereferencing an object. In particular, dereferencing an object that is then destructed can cause an unbounded cascade of object destructions with the associated overhead. Another concern with reference counting is that a circular reference structure can mean that a set of objects that refer to each other in a cyclic graph are not reachable from the rest of the application, yet their reference counts do not go to zero, thus the objects cannot be reclaimed.

Another approach to object destruction is to provide a so-called garbage collection (GC) mechanism that runs periodically to discover objects that no longer have any references and destruct those objects. This avoids the overhead of reference counting, but incurs a significant cost to scan memory to locate all references to each object to identify those that no longer have references.

FIG. 2 is a diagram illustrating a generational GC example. In this diagram, the memory is divided into three portions: process stack 202, newer (e.g., recently created) objects 204, and older objects 206. In some implementations, it is adequate to only scan the segment containing recently created objects in the common case because most objects lose all their references shortly after creation.

With large memories, this GC task can require processing on the order of minutes or longer to complete, substantially interfering with application responsiveness and progress. The application often requires an increased amount of memory in order to run, given that there can be a significant amount of unreferenced yet unreclaimed memory because of GC task delays. The resulting larger amount of memory increases the resource requirements and thus the cost of running the application. While techniques such as so-called generational garbage collection seek to reduce the need to review all of memory, they are dependent on certain application behaviors that can cause unpredictable performance because these behaviors change with scale. Moreover, many garbage collection techniques require memory compaction, which entails relocating many of the objects in memory, with further attendant overhead on, and inference with, application processing.

Application memory requirements are increasing, thus all of these costs are also increasing. The complexity of reclamation schemes is increasing accordingly, introducing unpredictable performance and in some cases, failures, to application execution. What is needed is an efficient way of destructing objects that is not error-prone.

BRIEF DESCRIPTION OF THE DRAWINGS

Various embodiments of the invention are disclosed in the following detailed description and the accompanying drawings.

DETAILED DESCRIPTION

Figure 1:
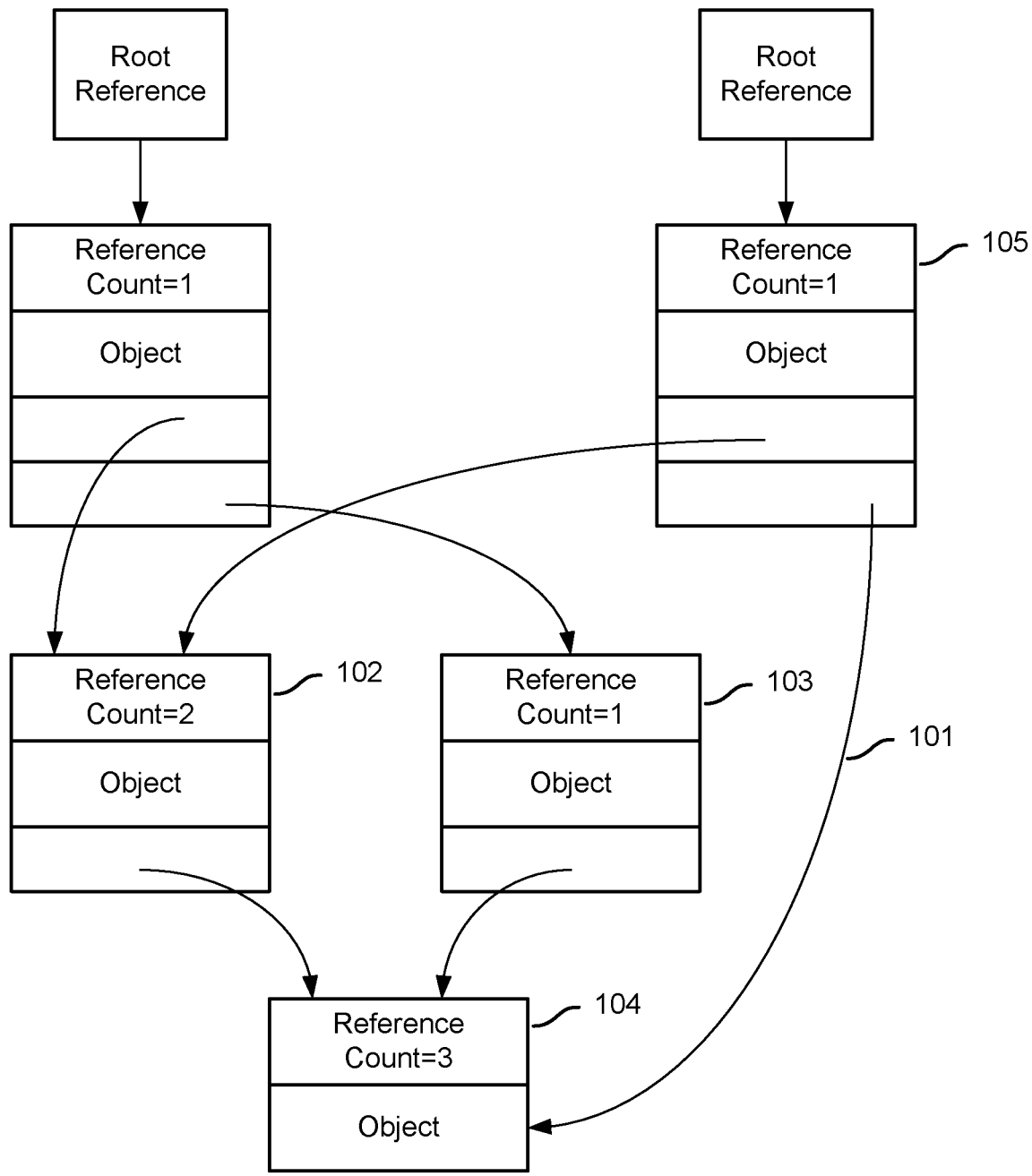
FIG. 1 is a data structure diagram illustrating an example of reference-counted objects.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Memory management based on deferred destruction of objects is disclosed. In some embodiments, a process that has a plurality of objects is executed. The objects are accessible by references. Examples of references include pointers, identifiers, handles, or other appropriate structures used to access the object in memory. At various points during the execution of the process, some of the references are transient references and some of the references are persistent references. As used herein, a transient reference is a reference that exists for a short period of time, typically just during the execution of a procedure. For instance, a transient reference can arise as a pointer to an object stored in a local variable on the processing stack of the thread during the execution of a procedure. Therefore, such a reference only exists while the thread is executing the procedure. In contrast, a persistent reference exists for a longer period of time. A persistent reference is typically stored in a global variable or in a field in an object stored in the process memory heap or allocated storage. Thus, it persists until the references are overwritten or this memory is reclaimed. Normally, a persistent reference is only allowed to refer to an object stored in the memory heap. As will be described in greater detail, transient references are typically unrecorded, and persistent references are typically recorded (e.g., tracked using a reference count.) In some embodiments, the programmer determines whether a reference should be transient or persistent by specifying its behavior. In some embodiments, the compiler recognizes whether a reference is transient or persistent by recognizing that the reference refers to a local variable on the stack or an object on the process memory heap, respectively, and manages the reference and its associated memory accordingly.

In embodiments described herein, there are points in time, referred to as reclamation points, at which transient references do not exist (in other words, the transient references are deallocated or set to null) or only exist at known locations. Upon reaching a reclamation point, objects that have no persistent references and no transient references are destructed. In some embodiments, persistent references are recorded and transient references are unrecorded (e.g., a persistent reference causes an object's reference count to increment and a transient reference does not cause the reference count to increment), so that at reclamation points, objects referred to by persistent references are not destructed/recreated after process restart. In some embodiments, instead of using reference counts, objects are created in such a way that only persistent objects are reachable from persistent roots and recreated after process restart.

Figure 12:
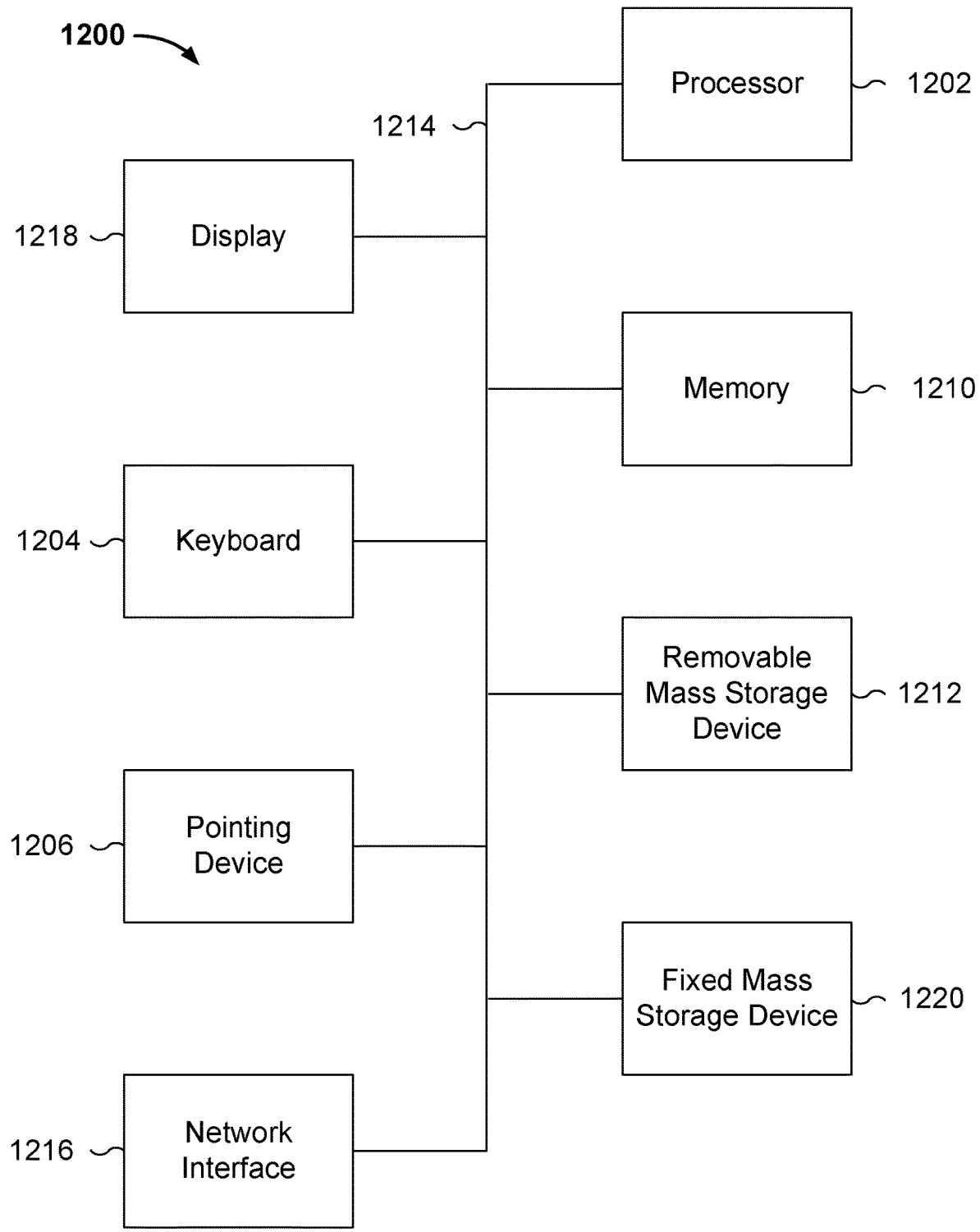
FIG. 12 is a functional diagram illustrating a programmed computer system on which memory reclamation is performed in accordance with some embodiments.

FIG. 12 is a functional diagram illustrating a programmed computer system on which memory reclamation is performed in accordance with some embodiments. As will be apparent, other computer system architectures and configurations can be used to perform memory reclamation. Computer system 1200, which includes various subsystems as described below, includes at least one microprocessor subsystem (also referred to as a processor or a central processing unit (CPU)) 1202. For example, processor 1202 can be implemented by a single-chip processor or by multiple processors. In some embodiments, processor 1202 is a general purpose digital processor that controls the operation of the computer system 1200. Using instructions retrieved from memory 1210, the processor 1202 controls the reception and manipulation of input data, and the output and display of data on output devices (e.g., display 1218). In some embodiments, processor 1202 and memory 1210 are used to provide memory reclamation functions.

Processor 1202 is coupled bi-directionally with memory 1210, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1202. Also as is well known in the art, primary storage typically includes basic operating instructions, program code, data, and objects used by the processor 1202 to perform its functions (e.g., programmed instructions). For example, memory 1210 can include any suitable computer-readable storage media, described below, depending on whether, for example, data access needs to be bi-directional or uni-directional. For example, processor 1202 can also directly and very rapidly retrieve and store frequently needed data in a cache memory (not shown).

A removable mass storage device 1212 provides additional data storage capacity for the computer system 1200, and is coupled either bi-directionally (read/write) or uni-directionally (read only) to processor 1202. For example, storage 1212 can also include computer-readable media such as magnetic tape, flash memory, PC-CARDS, portable mass storage devices, holographic storage devices, and other storage devices. A fixed mass storage 1220 can also, for example, provide additional data storage capacity. The most common example of mass storage 1220 is a hard disk drive. Mass storage 1212, 1220 generally store additional programming instructions, data, and the like that typically are not in active use by the processor 1202. It will be appreciated that the information retained within mass storage 1212 and 1220 can be incorporated, if needed, in standard fashion as part of memory 1210 (e.g., RAM) as virtual memory.

In addition to providing processor 1202 access to storage subsystems, bus 1214 can also be used to provide access to other subsystems and devices. As shown, these can include a display monitor 1218, a network interface 1216, a keyboard 1204, and a pointing device 1206, as well as an auxiliary input/output device interface, a sound card, speakers, and other subsystems as needed. For example, the pointing device 1206 can be a mouse, stylus, track ball, or tablet, and is useful for interacting with a graphical user interface.

The network interface 1216 allows processor 1202 to be coupled to another computer, computer network, or telecommunications network using a network connection as shown. For example, through the network interface 1216, the processor 1202 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1202 can be used to connect the computer system 1200 to an external network and transfer data according to standard protocols. For example, various process embodiments disclosed herein can be executed on processor 1202, or can be performed across a network such as the Internet, intranet networks, or local area networks, in conjunction with a remote processor that shares a portion of the processing. Additional mass storage devices (not shown) can also be connected to processor 1202 through network interface 1216.

An auxiliary I/O device interface (not shown) can be used in conjunction with computer system 1200. The auxiliary I/O device interface can include general and customized interfaces that allow the processor 1202 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 12 is one example of a computer system suitable for use with the various embodiments disclosed herein. Other computer systems suitable for such use can include additional or fewer subsystems. In addition, bus 1214 is illustrative of any interconnection scheme serving to link the subsystems. Other computer architectures having different configurations of subsystems can also be utilized.

Figure 3:
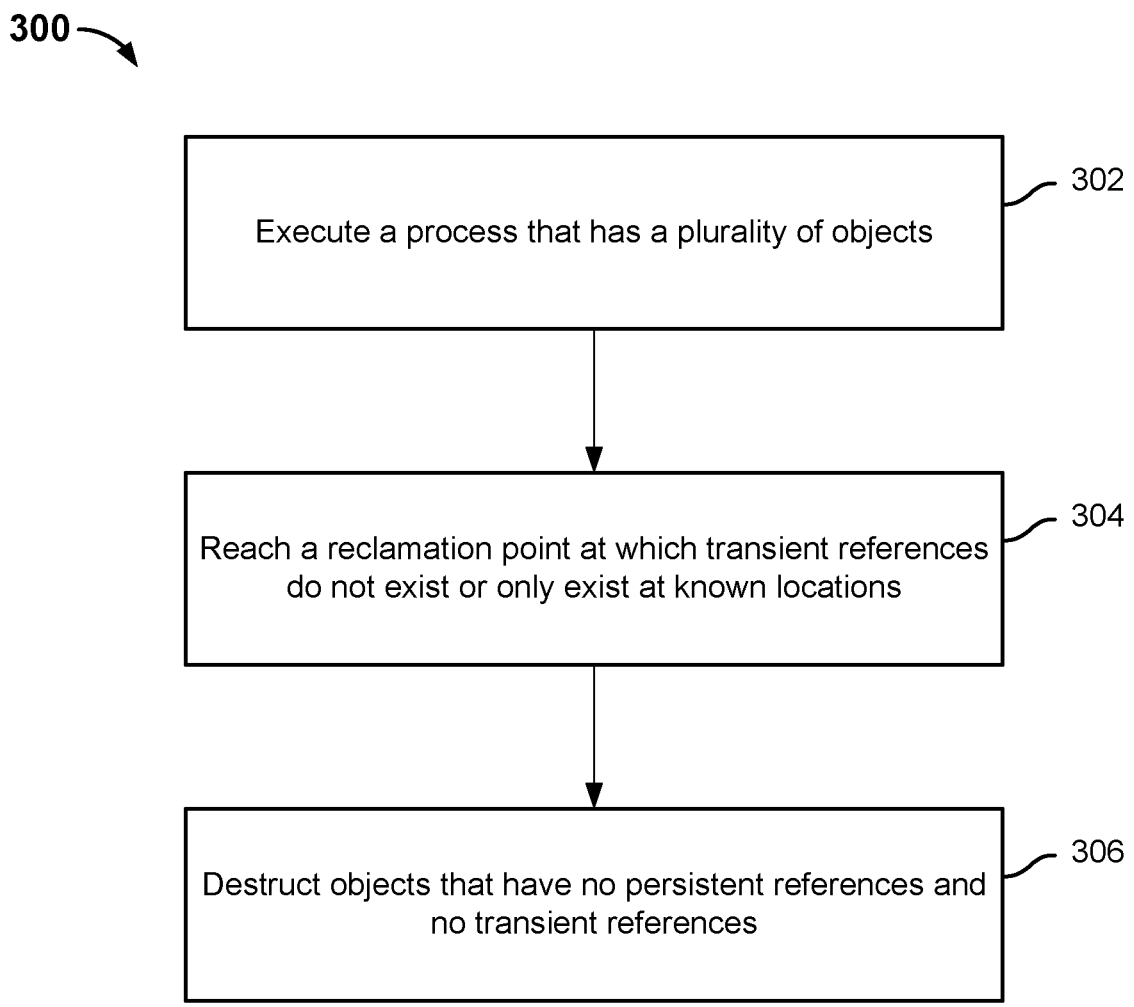
FIG. 3 is a flowchart illustrating an embodiment of a memory reclamation process.

FIG. 3 is a flowchart illustrating an embodiment of a memory reclamation process. Process 300 can be performed on a system such as 1200 of FIG. 12. At 302, a process that has a plurality of objects executes. Specifically, the objects are accessible via a plurality of references. At least some of the plurality of references are transient references, and at least some of the plurality of references are persistent references. At 304, a reclamation point is reached at which transient references do not exist or only exist at known locations. How to reach the reclamation point is described in greater detail below. For example, the reclamation point can be reached when the process' memory usage has exceeded a threshold and the process is restarted. At 306, at the reclamation point, objects that have no persistent references and no transient references are destructed.

Figure 4:
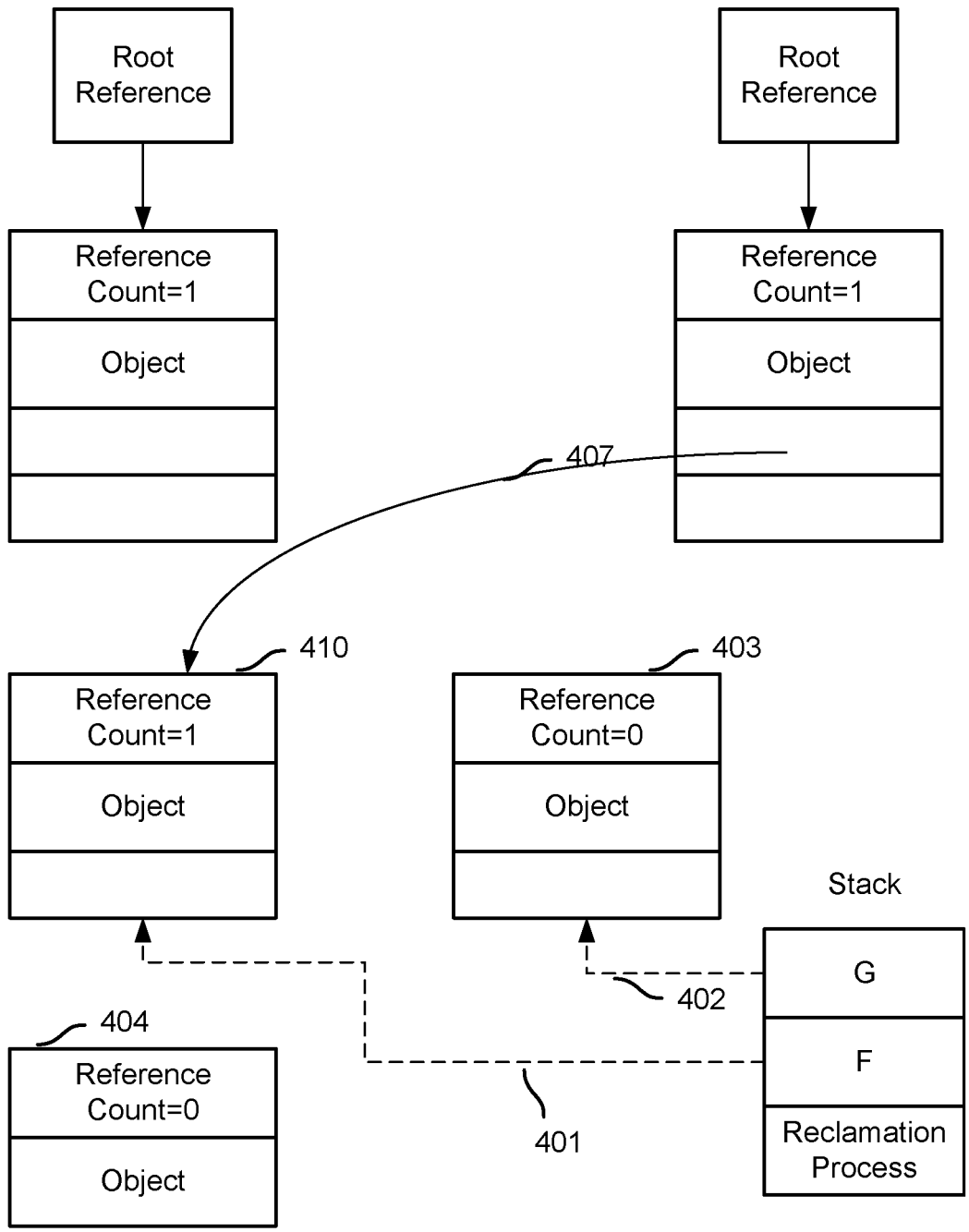
FIG. 4 is a data structure diagram illustrating an embodiment of objects in memory with persistent references and/or transient references.

FIG. 4 is a data structure diagram illustrating an embodiment of objects in memory with persistent references and/or transient references. As shown, edges drawn using dash lines (such as 401) represent transient references, and edges drawn using solid lines (such as 407) represent persistent references. In this example, an object's reference count only counts the number of persistent references referencing this object. In the example shown, transient references are on the process stack. Specifically, transient references 401 and 402 are variables on the stack that are used by processes F and G, respectively. When processes F and G are completed, their respective transient references are removed from the stack. Accordingly, a reclamation point is reached, and a reclamation process starts to reclaim memory. At the reclamation point, object 404, which has a reference count of 0 and no transient references, is to be reclaimed. Object 403 has a reference count of 0 because it has no persistent reference, and no longer has a transient reference because process G is finished and transient reference 402 is removed. As such object 403 will be reclaimed. Object 410, which has a persistent reference (and consequently a reference count>0), is not reclaimed. Note that in some embodiments (not shown), at the reclamation point, it is permissible for transient references to exist at known locations. If such transient references exist, they are treated as persistent references and any object referenced by such transient references are not reclaimed. Details of the reclamation are described more fully below.

Restart-Based Reclamation

Figure 5A:
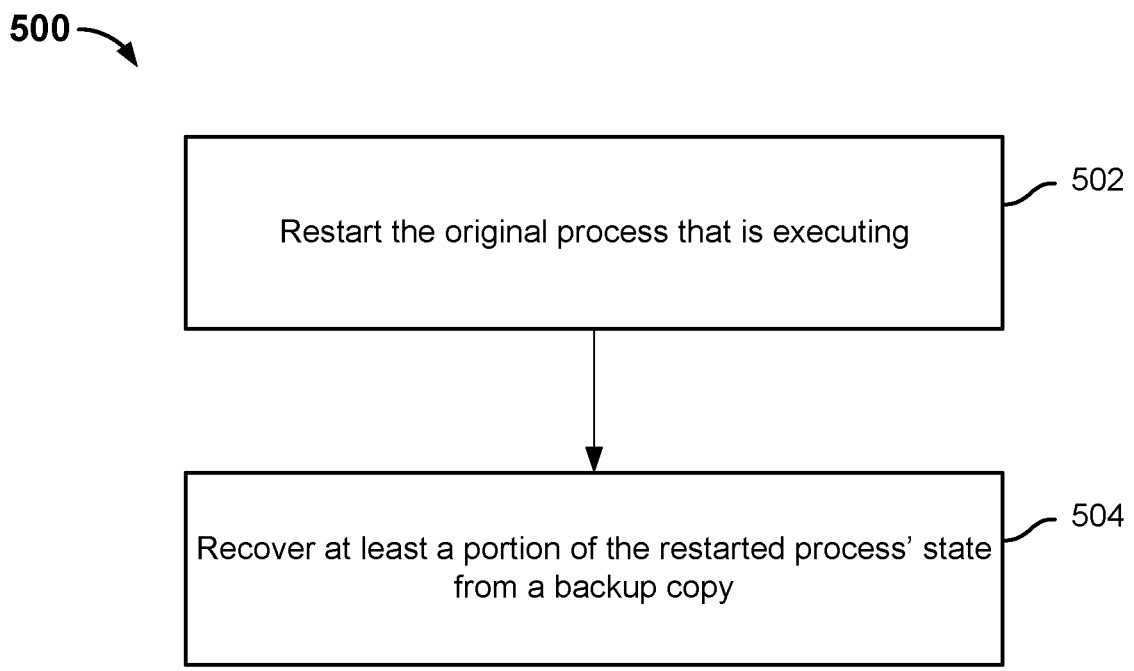
FIG. 5A is a flowchart illustrating an embodiment of a process for reaching a reclamation point using restart-based memory reclamation.

In some embodiments, memory reclamation is achieved by leveraging the process restart mechanism (e.g., a process manager, the operating system, etc.) that is required by existing fault tolerant systems. FIG. 5A is a flowchart illustrating an embodiment of a process for reaching a reclamation point using restart-based memory reclamation.

Flow 500 is used to reach a reclamation point and can be used to implement 304 of process 300. In this example, the process that is executing and subject to memory reclamation has a process state. As used herein, the process state refers to everything that has to do with the state of the process, such as memory state, stack state, process registers, etc. Typically, the stack state and process register information are lost when the process fails. The memory state refers to the portion of the memory that is preserved, including persistently referenced objects on the heap. In particular, the process state includes information about objects and their references. In addition, the fault tolerant mechanism (e.g., a process manager, the operating system, etc.) maintains a backup copy of the process state to handle failure conditions of the process, such as failure due to a software or hardware error. As will be shown in more detail below, in embodiments of the present application, the backup copy of the process states includes objects with persistent references.

It is generally infeasible to recover the exact state of the failed process because it is expensive to transfer every memory write from the original process to the backup copy of the process state such that such a write cannot be lost because of a failure. Moreover, transferring the exact state is not advisable, given that restarting a process at the precise point that the previous instance failed is likely to lead to a repeat of the same failure, if the failure was caused by a software defect. Consequently, the backup copy normally represents an earlier state of the process. In some embodiments, the backup copy only has the state associated with the memory heap but not the stack, and in particular, only has the persistent references but not the transient references.

Returning to FIG. 5A, flow 500 is initiated when memory should be reclaimed. For example, flow 500 can be initiated when the original process itself, a process manager, or any other process that monitors processes running on a system detects that the amount of memory used by the process exceeds a threshold and determines that memory reclamation should take place. At 502, an original process that is executing is restarted.

Figure 5B:
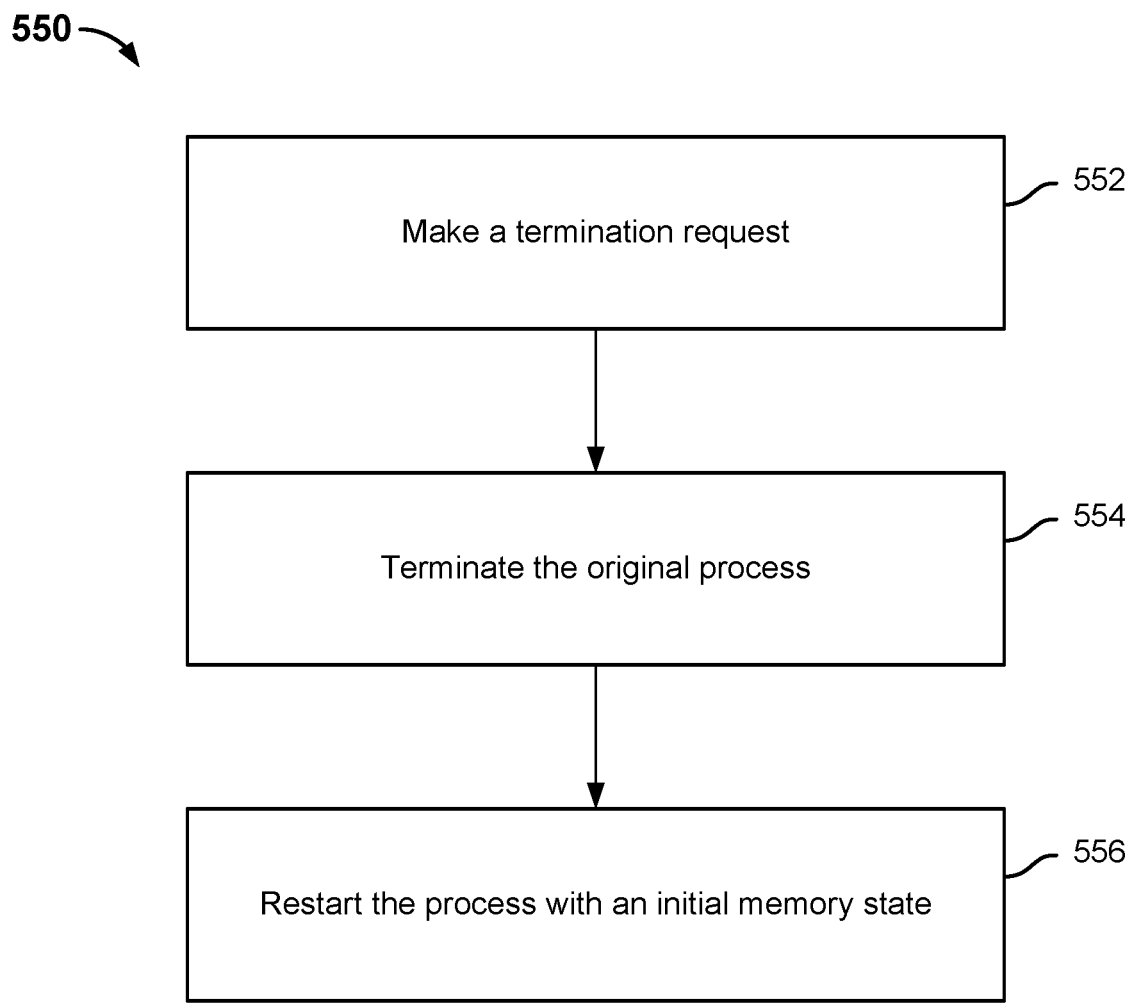
FIG. 5B is a flowchart illustrating an embodiment of a process for restarting the original process.

FIG. 5B is a flowchart illustrating an embodiment of a process for restarting the original process. In this example, process 550 for restarting the original process can be used to implement 502 of process 500. At 552, upon determining that memory reclamation should take place, a termination request is made. In various embodiments, the original process itself or the process manager requests the operating system to terminate the original process. At 554, the original process is terminated. In some embodiments, the operating system terminates the original process, and reclaims all memory and other resources allocated to the original process. At 556, the process is restarted with an initial memory state. In some embodiments, a process restart mechanism such as the process manager is informed of the termination or discovers the termination, and in response restarts the process (e.g., load the process into memory and begin execution) with an initial memory state such as a default memory state of the process.

Figure 5C:
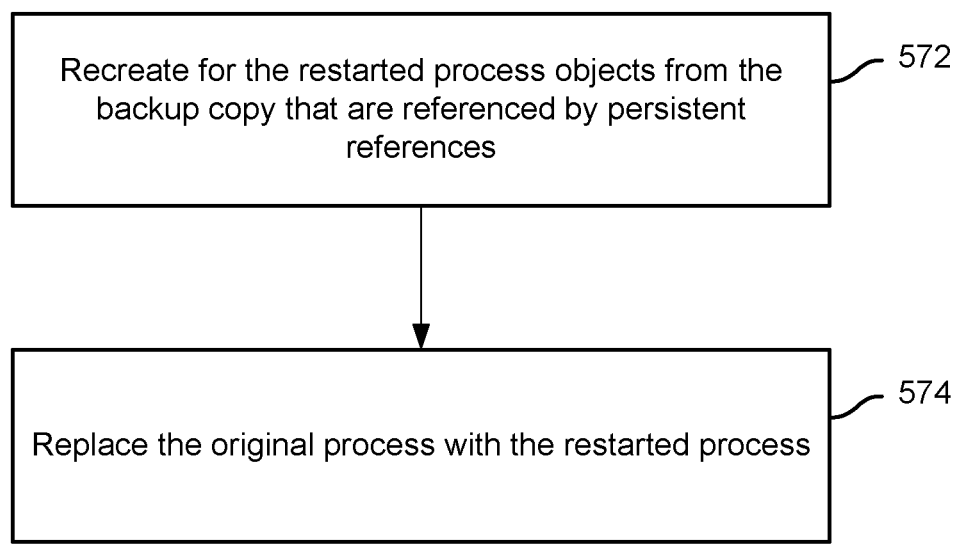
FIG. 5C is a flowchart illustrating an embodiment of a process for recovering the process state from the backup copy.

Returning to FIG. 5A, at 504, at least a portion of the restarted process' state is recovered from a backup copy, which has the same objects that have persistent references as the original process state, but has fewer objects with only transient references compared with the original process state or no such objects at all. FIG. 5C is a flowchart illustrating an embodiment of a process for recovering the process state from the backup copy. Process 570 can be used to implement 504 of process 500. At 572, objects from the backup copy that are being referenced by persistent references are recreated for the restarted process. In some embodiments, the restarted process copies from the backup copy objects with persistent references and excludes objects with only transient references when recreating its memory state. The effect is that the amount of memory associated with objects with only transient references is reclaimed. At 574, the restarted process replaces the original process. In some embodiments, the process or process manager coordinates with the rest of the system, signaling as necessary to the rest of the system that the restarted process is the replacement for (or a new instance of) the original process.

Figure 6:
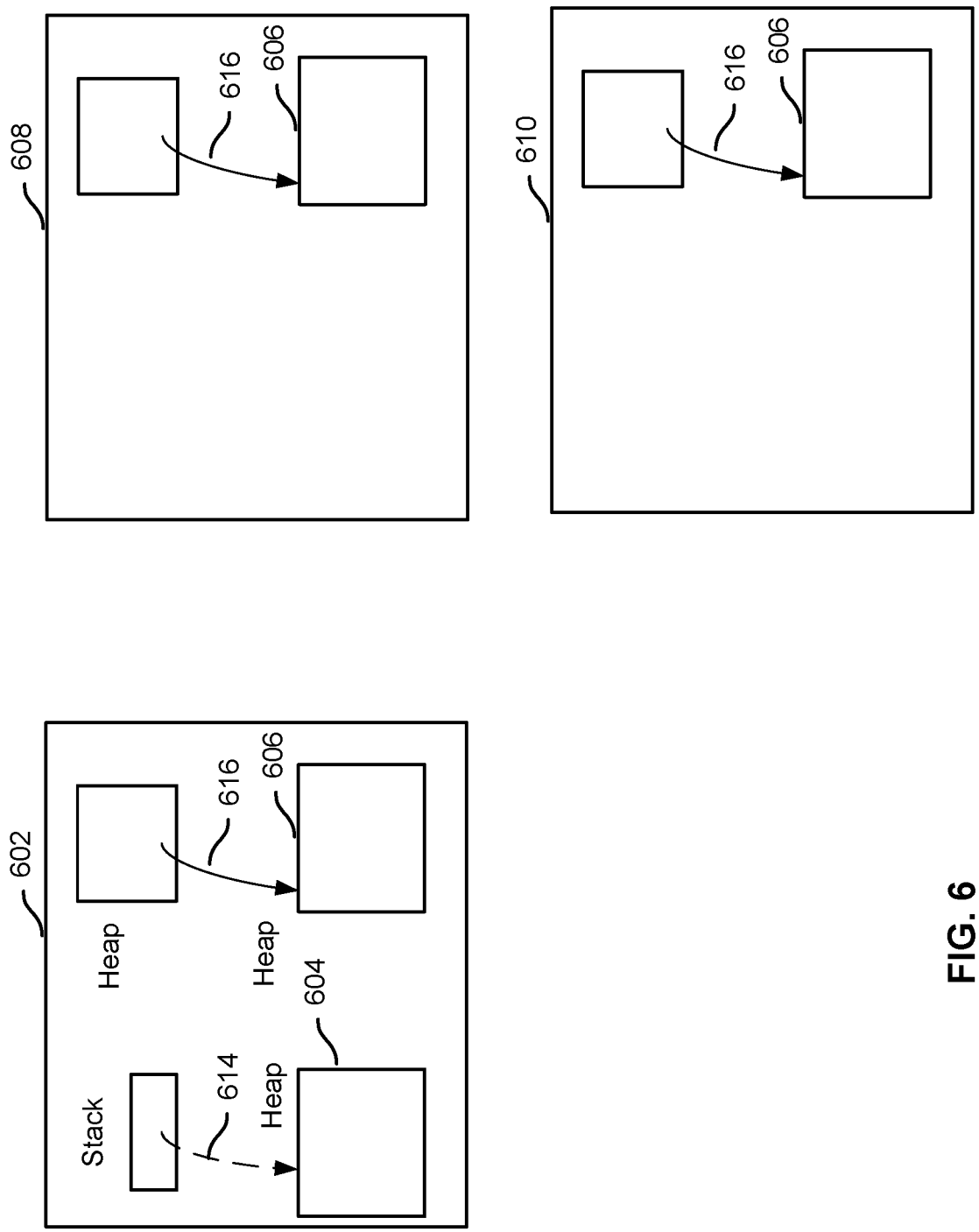
FIG. 6 is a diagram illustrating an example of process states in a restart-based reclamation process.

FIG. 6 is a diagram illustrating an example of process states in a restart-based reclamation process. The flows of FIGS. 5A-5C are explained in connection with FIG. 6. As shown in FIG. 6, original process state 602 has an object 604 that is on the heap and referenced by a transient reference 614 from a variable on the stack and an object 606 that is on the heap and referenced by a persistent reference 616. A backup copy of the process state 608 includes one or more objects that have persistent references but no object with only transient references. In this case, the backup copy of the memory state includes object 606 but does not include object 604. Thus, when the process is restarted, the newly restarted process' memory state 610, which is recovered from backup copy 608, also includes object 606 but not object 604.

In some embodiments, the programmer specifies what to preserve or discard when the process restarts. Specifically, persistent references are made to those objects that should be preserved on restart (e.g., session information, user data, transaction information, etc.), and transient references are made to those objects that do not need to be preserved on restart (e.g., history information, log information, etc.).

Persistent references are removed from pointing to an object when it is no longer needed so it is not preserved on restart.

In practice, a process state typically includes one or more root persistent references that ensure the top-level objects are referenced. Other objects are referred to by the top-level objects and refer to still more objects, forming a tree-like graph of the objects. Thus, in some embodiments, the backup process state is provided to the restarted process by starting with the root persistent references to objects and transferring (e.g., copying), to the restarted process, each object referenced by the root persistent references, and then, recursively, transferring all objects referenced by the transferred objects to achieve transitive closure.

Figure 7:
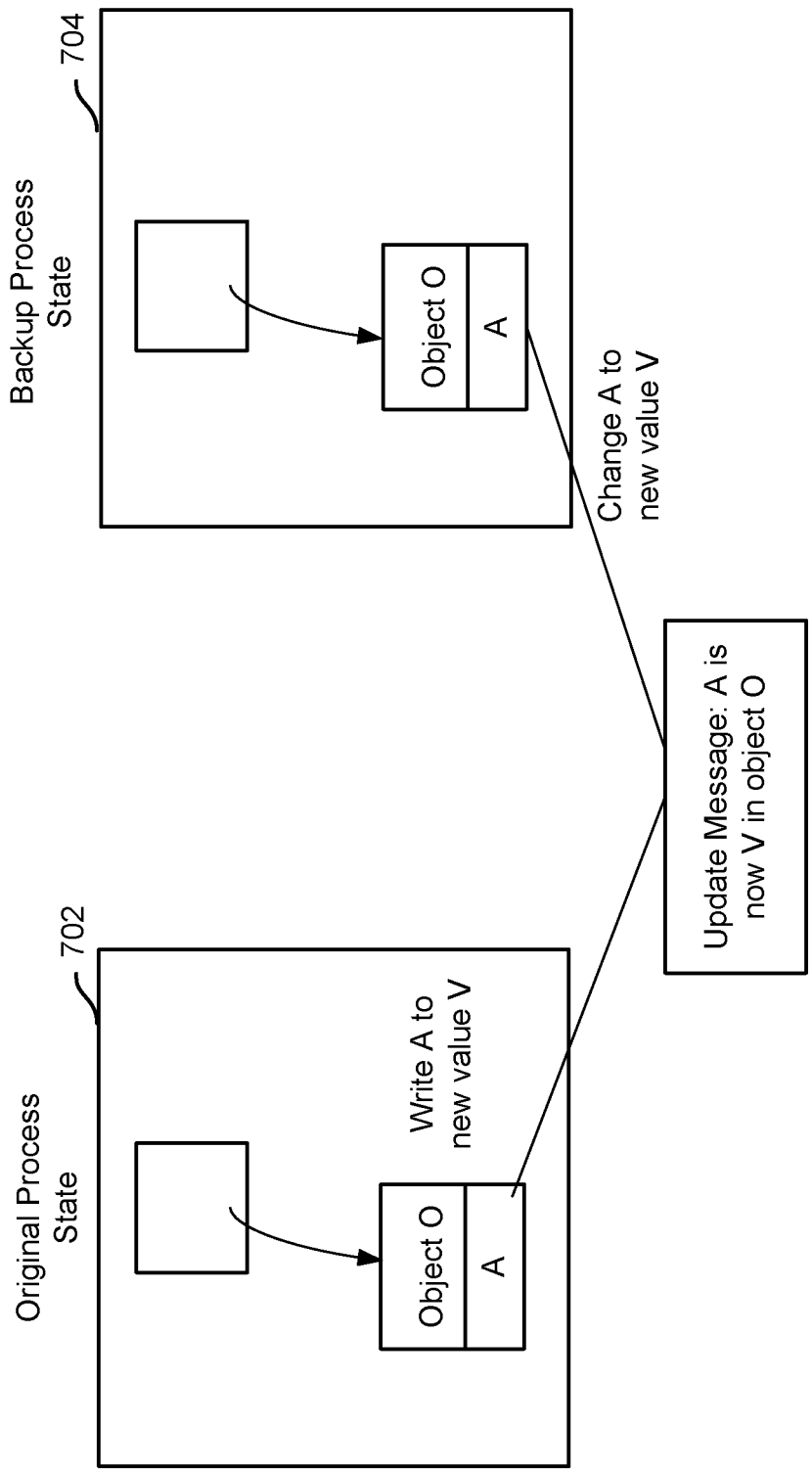
FIG. 7 is a memory state diagram illustrating an example of incremental updates to the process' heap memory state.

In some embodiments, the backup copy is maintained by tracking incremental updates to the original process' heap memory state. FIG. 7 is a memory state diagram illustrating an example of incremental updates to the process' heap memory state. In this example, incremental updates to the original process' heap memory state 702 are streamed (e.g., sent asynchronously) to the backup copy's heap memory state 704 during the original process' execution, thus maintaining a backup copy that is approximately a replica of the original process' memory state and ensuring that the backup copy is reasonably up-to-date relative to the current process state. For example, when an attribute of object O is changed from A to V on the original process' memory state 702, an update message is sent (e.g., to the executing process itself) as a notification of this change, so that the same update can be made on the backup copy accordingly.

In some embodiments, the backup copy is represented using a reference graph similar to that illustrated in FIG. 1. For instance, the backup copy can be maintained as an in-memory instantiation of objects with references that mirror the memory state (heap state) of the original process state.

The updates may also include deletion of references to objects, and therefore can cause one or more objects to be unreferenced relative to the root references yet still be present in the backup copy. An unreferenced object in the backup copy is not recreated by the restarted process because such an object is not found by following the transitive closure of references in the reference graph to locate objects, as described above. For example, if the only reference to object O is deleted from original copy 702, then object O becomes unreferenced. A message regarding the deletion is sent to backup copy 704, which will also delete the reference and leave object O unreferenced in the backup copy. When recovering states from the backup copy, the unreferenced object is not copied from the backup copy; thus, the memory associated with such an object is reclaimed.

In some embodiments, the system state is partitioned between state-oriented processes and processing-oriented processes. The former typically performs relatively little or restricted processing, while the latter performs the majority of the processing logic of the application. For example, a database process may be considered as a state-oriented process and a webserver process may be considered as a processing-oriented process. In some embodiments, each state-oriented process executes while streaming incremental updates of its state to a backup process that maintains a replica in-memory copy of this state from these incremental updates. The replica is also referred to as a backup copy of the memory state. In some embodiments, reclaiming memory for a state-oriented process includes restarting the state-oriented process using a failover transition.

Figure 8:
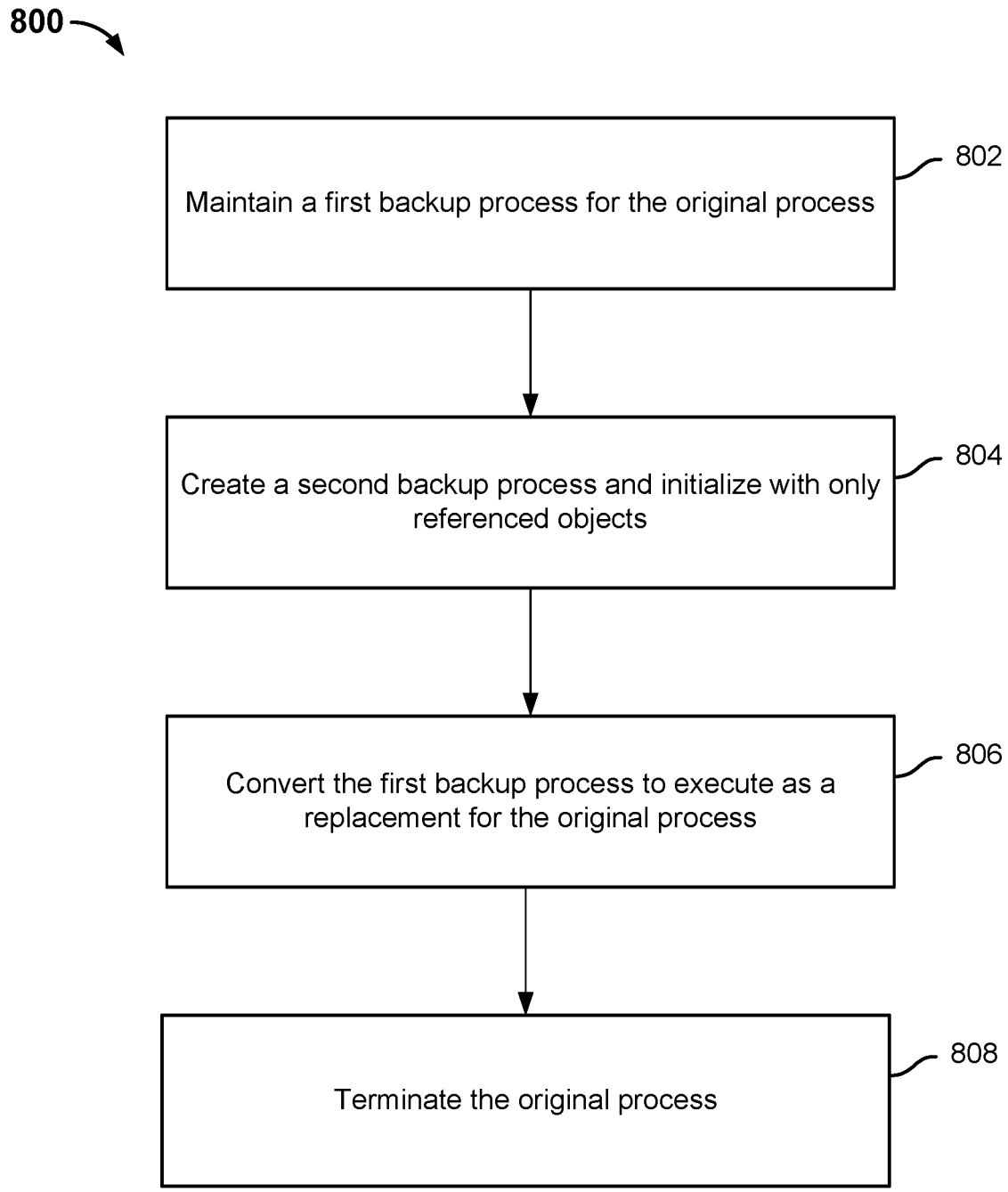
FIG. 8 is a flowchart illustrating an embodiment of a flow for restarting a process.

FIG. 8 is a flowchart illustrating an embodiment of a flow for restarting a process. In this example, a state-oriented process is the original process. At 802, a first (existing) backup process is maintained for the original process. The original process executes while streaming incremental updates to its process state to the first backup process, which maintains a replica in-memory copy of the original process' memory state as a first backup copy of memory state, and adjusts the first backup copy based on the updates.

When it is determined that memory reclamation should take place (e.g., when the state-oriented process has exceeded a threshold memory usage level), to reach the reclamation point, a failover transition takes place. At 804, a second backup process is created. The second backup process is a backup process for the first backup process, which will replace the original process. The second backup process is initialized with only referenced objects in the existing process state, which is reflected in the first backup copy of the memory state. In some embodiments, the initialization is performed by following references from the root persistent reference as described earlier. Thus, any unreferenced object (e.g., an object whose persistent reference(s) have been deleted during one or more updates) is not included in the resulting second backup process state. Thus, the second backup process state includes fewer unreferenced objects than the first backup process state. At 806, the first backup process is converted to execute as a replacement for the original state-oriented process. In some embodiments, the rest of the system is signaled to treat the first backup process as the replacement for the original process. At 808, the original process is terminated and the first backup process becomes the "original process" for the next round of reclamation.

In some embodiments, after process 800 is completed, 804-808 are repeated such that a third backup process is created and initiated with only referenced objects from the existing memory state (which are reflected in the second backup process' memory state). The third backup process runs as the backup process of the second backup process. The second backup process becomes the replacement process and the first backup process is terminated. At this point, no objects that existed in the original state-oriented process that had no references continue to exist in the second backup process which, after the second transition, has become the replacement state-oriented process.

Figure 9:
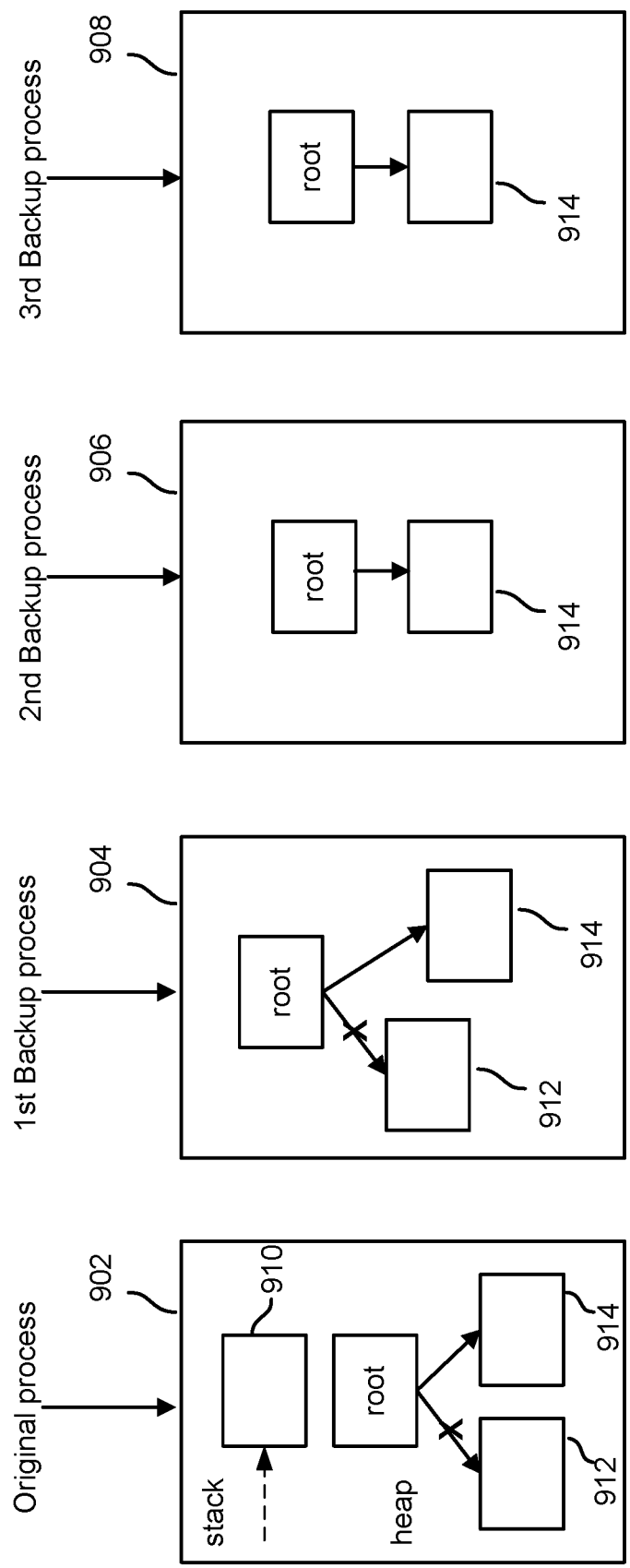
FIG. 9 is a data diagram illustrating an example of process states in a restart-based reclamation process.

Flow 800 is explained in connection with FIG. 9. FIG. 9 is a data diagram illustrating an example of process states in a restart-based reclamation process. In this example, the original process state is 902. A first backup copy of process state, 904, is maintained as a replica in-memory instantiation of the original memory state (in other words, the backup copy is stored in memory rather than on disk). The first backup copy has objects with references that mirror the memory state (heap state) of the original process. In this example, in process state 902, object 910 is an object on the stack that has transient references only. According to the requirements for reaching the reclamation point, object 910 is not mirrored on first backup copy 904. Objects 912 and 914 have persistent references. According to the requirements, objects 912 and 914 are mirrored on first backup copy 904. During execution, the persistent reference to 912 is deleted and object 912 becomes unreferenced. This incremental update is mirrored on first backup copy 904, and object 912 on the first backup copy also becomes unreferenced.

When the original process is restarted, a second backup process is created. A second backup copy of the state, 906, is instantiated based on referenced objects in the first backup copy 904. The first backup copy 904 is directly used by the first backup process, which acts as an executing process that takes over the functionality of the original process. The original process is terminated at this point. In this way, first backup copy 904 becomes the new primary process state for the restarted process. First backup copy 904 causes memory associated with objects only referenced by transient references to be reclaimed. For example, object 910 is not present on backup copy 904. Backup copy 904 also includes certain objects that have lost their persistent references (e.g., object 912) and the memory associated with these objects is not reclaimed at this point. Because unreferenced objects such as 912 are not recreated in second backup copy 906, memory associated with the unreferenced objects becomes reclaimed when a next reclamation point is reached. At the next reclamation point, a third backup process is created and a third backup copy of memory state, 908, is initiated with only referenced objects from the second backup copy 906. Second backup copy 906 is directly used by the restarted process. The latest process state has no objects that are only referenced by transient references, and has no unreferenced objects. In other words, a complete restart of the state-oriented process is achieved after two transitions, with a first transition replacing the original process with the first backup process, then a second transition replacing the first backup process with the second backup process, such that unreferenced objects or objects only referenced by transient references do not exist in the current active process (namely, the second backup process).

In some embodiments, the management of the state-oriented process and its backup process ensures that the backup process has been running in synchronization with the state-oriented process for a shorter period of time than the state-oriented process has been running. For example, if the original state-oriented process has been running for 30 seconds, the first backup has only been running and synchronized with this original state-oriented process for the last 15 seconds. Consequently, the first backup copy can be expected to have fewer objects that have no references than the original. Assuming that objects become unreferenced at the rate of one object per second, then the original process would have 30 unreferenced objects at the end of the 30 second time period, but the first backup copy would only have 15 unreferenced objects accumulated over the last 15 seconds. Continuing this example, if a transition is then caused to create a new, second backup and failover to the first backup from the original, the newly active state-oriented process has 15 seconds of accumulation of non-referenced objects while the second backup has no unreferenced objects. In this example, assuming objects become unreferenced at a constant rate, each failover transition effectively reclaims half of the unreferenced objects from the standpoint of the state in this state-oriented process. Further, the rate of failover transitions can be regulated according to the rate of accumulation of unreferenced objects versus the cost of failover transitions. Given a specific rate at which non-referenced objects are generated and the desired rate at which non-referenced objects are accumulated, the rate of failover transition/restart can be determined. A higher rate of failover transitions will result in fewer unreferenced objects being accumulated but incur a higher failover transition cost.

In some embodiments, there are multiple state-oriented processes running in the system or in an application. The persistent states of these processes collectively form the persistent state of the system or application. This persistent state is treated as the committed or true state. A processing-oriented process, on restart, recovers its process memory state from the state-oriented processes that contain and maintain its persistent state.

In some embodiments, the incremental updates are recorded in an update log, similar to a redo log that is well known in the art. In such cases, it is possible for the replay of the incremental update records to cause an object to be recreated that is not referenced once the entire incremental update log has been fully replayed. However, performing multiple failover operations as shown above in FIGS. 8 and 9 can get rid of this artifact.

In some embodiments, the update log is realized as an inter-process communication connection between the active process and the backup copy of the process state. In such cases, log update records may be applied to the backup copy upon receiving the log update records, thereby making this backup copy more up-to-date.

In some embodiments, the backup copy of the process state is provided by a checkpoint mechanism (e.g., implemented using special code in the application) that periodically saves the current state of the process. For such cases, at each checkpoint, the saved process state includes only objects that have persistent references or only the persistently referenced objects are recreated in the restarted process, by starting from the root reference and recursively following the persistent references, as described above.

In some embodiments, the process backup copy is provided based on a combination of checkpoints and incremental updates. At each checkpoint, the corresponding process state is saved, and incremental updates are produced between checkpoints to keep the process state up-to-date. On process restart, the process state is recovered from the most recent available and complete checkpoint plus the incremental updates that have occurred since the creation of the checkpoint. The number of unreferenced objects that are recreated on process restart is bounded by the number of unreferenced objects that are created and then deleted since the time of the last checkpoint.

In some embodiments, updates to the heap memory are encapsulated in transactions wherein a transaction defines a set of changes that must be committed together or not at all. In such cases, the updates may be applied to the backup copy only upon transaction commit. Therefore, on recovery as well as reclamation, the restarted process resumes from the last committed state.

In some embodiments, a restarted process can commence processing even before it has fully recovered the process state of the original process. For example, the process may load proxies for remote objects on demand, depending on processing requirements. The proxies can be stub or shell that represent the objects but do not include all the details associated with the objects, such as parameter values. The restarted process can commence processing without any of the proxies that the original process had, deferring their instantiation until needed.

In some embodiments, during the restart process, the new process and the current process can run concurrently. Specifically, the new process is started before terminating the current process. The new process recovers the existing process state from the backup; meanwhile, the current process is still running, and continuing to make incremental updates and communicate the incremental updates to the backup copy as needed until the new process has recovered the existing process state from the backup. At this point, the backup further communicates any remaining updates it has received from the current process to the new process, the current process is suspended or terminated, and the new process takes over. For example, when the new process starts, the backup has persistently referenced objects A and B. The new process recovers the existing process state by copying objects A and B; before the new process completes the copying of A and B, the current process concurrently creates a new persistently referenced object C. The current process communicates the incremental update, the creation of object C, to the backup copy. Once the new process finishes copying A and B, the current process is suspended or terminated, and the backup copy notifies the new process of the creation of object C, which the new process will also create. Once the new process finishes copying object C, the new process takes over. In such cases, the restart can be viewed as migrating the computation from the original process to the new process. This approach minimizes the disruption to the application execution, i.e., the time between when the old process stops executing and the new process takes over.

In some embodiments, at a reclamation point, rather than terminating the current process and starting a new process, the current process can reset its memory state and recreate this state from the backup copy, thereby saving the cost of terminating the process and instantiating a new process.

Figure 2:
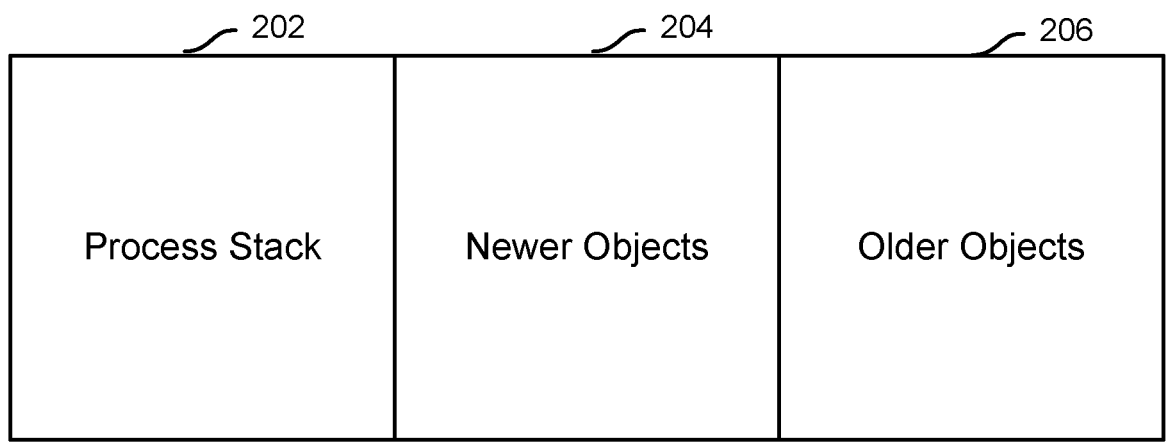
FIG. 2 is a diagram illustrating a generational GC example.

In some embodiments, rather than creating a separate backup copy of the process state, generation-based object tracking is used between reclamation points. The current process creates objects and tracks separate generations of objects in a manner similar to the known generational garbage collection technique, similar to what is shown in FIG. 2. Moreover, older objects are maintained in a separate memory segment that is retained across process restart. In some embodiments, at a reclamation point, and on restarting a new process, the separate memory segment for older objects is mapped to the address space of the new process so that the older objects are made available to the new process without change. The mapping can be implemented using operating system supported memory sharing functions known to those skilled in the art. Objects that are younger (i.e., created after the last reclamation cycle) and kept in a different memory region than the older objects are recreated for the new process and reclaimed using techniques described above. Optionally, at each reclamation point, persistently referenced objects that survived the reclamation will become "aged" and stored in the retained generation memory segment for older objects. This approach is efficient because older objects tend to be referenced persistently at a higher rate than younger objects. Using this approach, the cost of recreating the older objects is reduced, achieving similar benefits as generational garbage collection. In some embodiments, the reclamation/restart cycle described above is a minor reclamation cycle. Like generational garbage collection, in addition to the minor reclamation cycles, there can be a major cycle which occurs at a lower frequency than normal process restart in which the separate memory segment for the older objects is reclaimed using the same technique as described above. For instance, a backup copy of the older objects can be used to recreate the persistently referenced objects, and the separate memory segment for the older objects can be released. A similar approach can be used to retain certain resources such as network connections, rather than releasing these resources and reacquiring them on process restart.

In some embodiments, certain references are distinguished further as a weak reference or a strong reference. As used herein, a weak reference is a reference that does not prevent the object from being destructed, and can be set to null by the operating system or the application. Note that a weak reference is different from a transient reference from the programmer's perspective. A weak reference does not prevent an object from being destructed, but it is set to null when the object is destructed. In contrast, a transient reference does prevent an object from being destructed. For example, a child object can have a weak reference to its parent, so that if the parent is no longer referenced by any other object besides the child, both the parent and the child can be destructed. In such cases, on restart, an object to which there are only weak references is not recreated and any weak references to this object are set to null.

In another aspect, the operating system checks for memory usage and reclamation is triggered when a process reaches a configured memory limit. Many operating systems provide the ability to specify a limit on the amount of memory a given process can use. When a process reaches this limit, any memory allocation request by the process would be denied, or the operating system can simply terminate the process. In any case, the reclamation occurs as part of restart, as described above.

In some embodiments, the memory limit is dynamically adjusted based on application-specific measures of load. For example, if a process is handling N users, the application can be programmed to estimate the amount of memory strictly required for handling N users, for example K*N megabytes (where K is the amount of memory required per user), and adjust the memory limit to a new value, such as 2K*N megabytes. Thus, the process is caused to restart when it is using twice the memory that is strictly required for handling its offered load. In this example, the limit is proportional to the number of users. Other functions of limit can be used. This memory overhead is comparable to that reported for many garbage collected systems, but achieved without the garbage collecting overhead.

In a fault-tolerant system, the reclamation technique described above not only uses an existing mechanism, namely the process restart, but also ensures that this mechanism is exercised frequently, improving the likelihood that the mechanism works when a failure occurs. Conversely, it eliminates having a separate memory reclamation mechanism which requires extra testing and can be a separate source of failures. The reclamation technique also avoids on-going memory fragmentation. Memory is effectively compacted as part of restart. The reclamation technique can be used to move a process to a new host when the memory limit is hit because of a host limitation. Furthermore, in the case of the new restarting process being created before the original process is terminated, the interference with application execution is minimized.

Destruct List-Based Reclamation

As discussed above, in some embodiment, a persistent reference is said to be recorded because there is a record maintained for a persistent reference count to a persistent object. For example, there can be a reference count field indicating the number of persistent references associated with the object. A transient reference is not recorded in that it does not maintain or affect a reference count. Further, in some embodiments, there is a reclamation data structure such as a list of objects that are candidates for (deferred) destruction. This list is referred to as the destruct list.

Figure 10A:
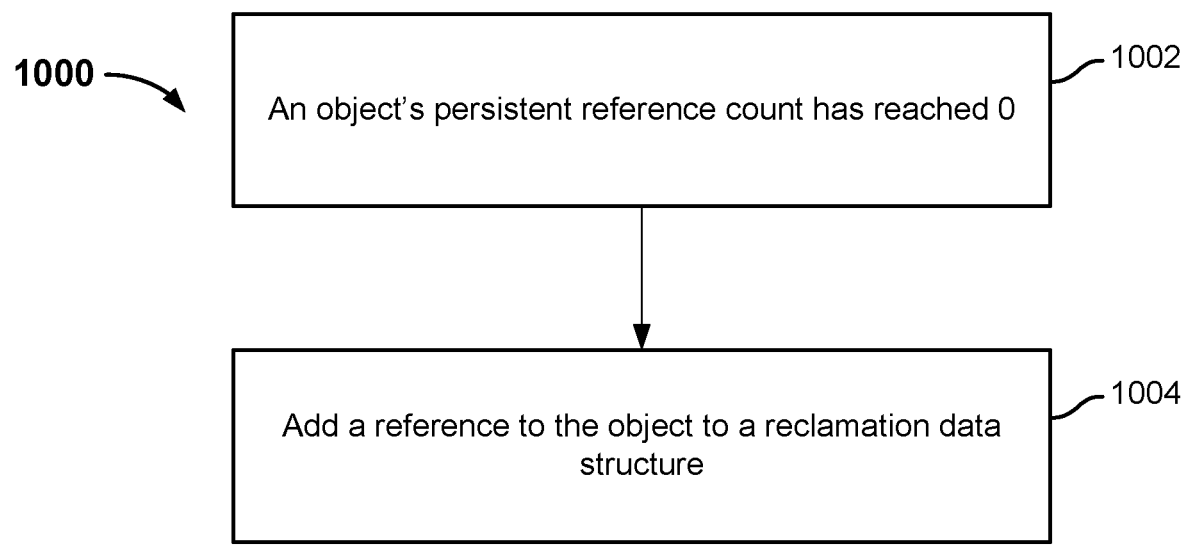
FIG. 10A is a flowchart illustrating an embodiment of a process for creating and using a destruct list for reclamation.

FIG. 10A is a flowchart illustrating an embodiment of a process for creating and using a destruct list for reclamation. Process 1000 is initiated when a persistent reference is removed from an object. At 1002, it is determined that the object's persistent reference count has reached 0. Thus, at 1004, a reference (e.g., a pointer) to the object is added to the reclamation data structure (e.g., the destruct list.) Process 1000 can be repeated for many objects. Later, when a reclamation point is reached periodically or in response to the process reaching a memory size threshold, a task thread iterates over the destruct list.

Figure 10B:
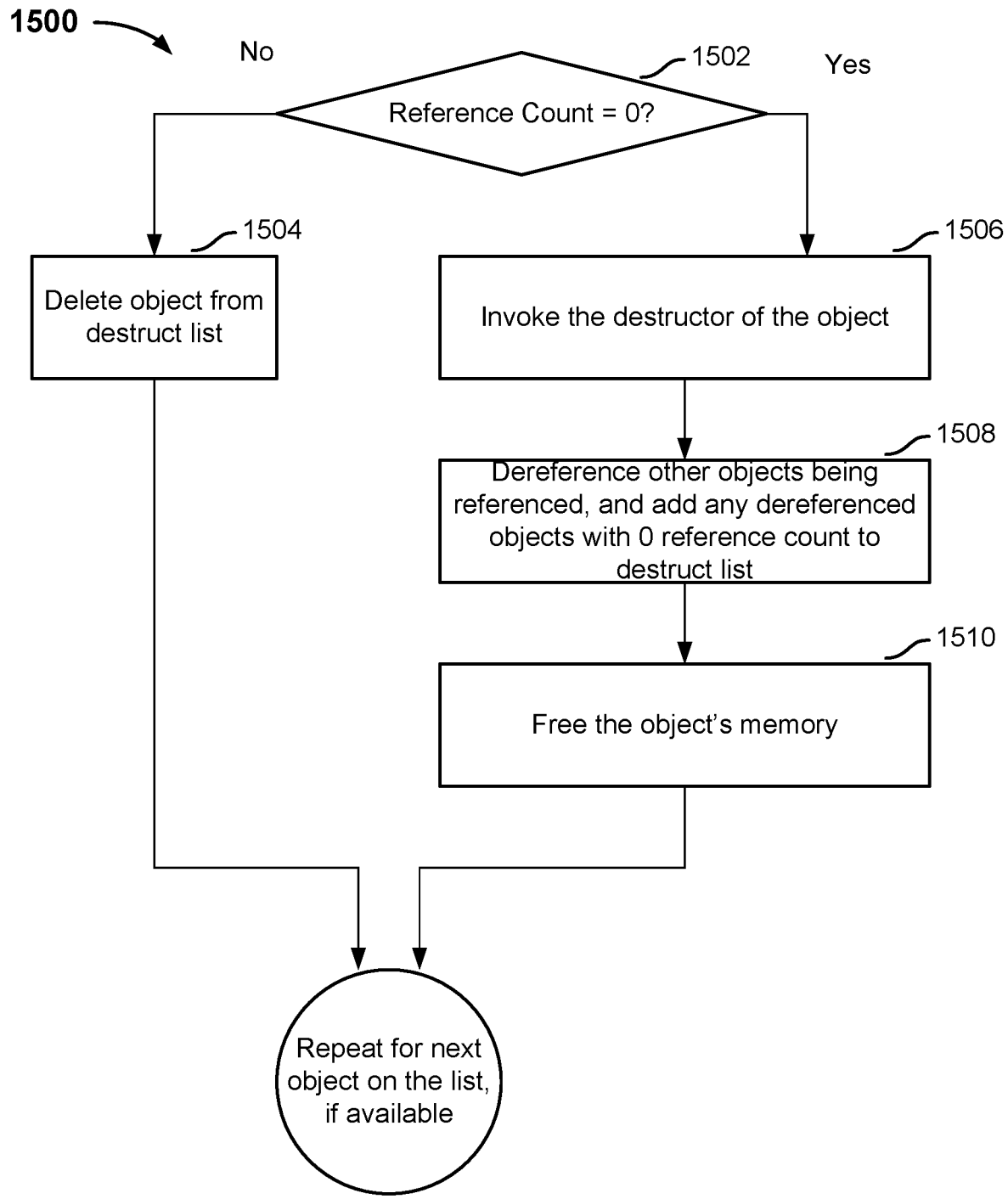
FIG. 10B is a flowchart illustrating an embodiment of a destruct list iterator process.

FIG. 10B is a flowchart illustrating an embodiment of a destruct list iterator process. At 1502, it is determined whether the object has a reference count of 0. An object on the destruct list may have a non-zero reference count if its reference count is incremented after the object was added to the destruct list. If the reference count is non-zero, at 1504, the object is deleted from the destruct list; otherwise, object-specific processing is performed. In particular, the destructor of the object is invoked at 1506. At 1508, the destructor of the object dereferences other objects being referenced by this object, and adds any dereferenced objects with 0 reference count to the destruct list. At 1510, the object's memory is freed. Process 1500 is repeated by the iterator for the next object in the destruct list, if the next object is available.

In some embodiments, the reclamation point is achieved by requiring that each thread yield periodically with no transient reference state on its stack and unreferenced objects are removed. In a multi-threaded process, the reclamation point can be achieved by implementing a barrier synchronization technique, which causes all threads to wait at the barrier until all threads are ready to proceed. Barrier synchronization techniques are known to those skilled in the art. To reclaim memory, at the barrier, the threads remove objects that are unreferenced. In applications where processing is divided into rounds (referred to as round-based computation) where threads must proceed together at each round, such a barrier would already be required by the application. Thus, the round barrier can also serve the purpose of a reclamation point when there is sufficient unreclaimed memory to justify performing the reclamation.

In some embodiment, a thread can be allowed to retain some number of transient references in known locations that are not in the memory heap. The reclamation processing must then be aware of these references and treat these references as effectively persistent references to the objects during reclamation. In other words, memory associated with these objects referenced by transient references in known locations is not reclaimed.

In the examples above, at a reclamation point, there are no objects only referenced by transient references.

In some embodiments, at a reclamation point, objects referenced by transient references only are allowed to exist so long as transient references to these objects can be easily found; for example, if the transient references can be directly accessed without having to search for them because the transient references are only located at specified locations. In other words, when the destruct thread/destruct list iterator runs from time to time to process objects on the destruct list, it is able to locate any transient references at the specified locations and treat these transient references specially. Specifically, when the persistent reference count of the object is 0, the existence of a transient reference to the object at a specified location is checked. The object is destructed and its memory released only if there is not a transient reference found at the specified location.

In some embodiments, both restart-based and destruct list reclamation can be used. Preferably, restart-based reclamation is invoked infrequently in response to memory fragmentation, cyclic references, and objects that are not placed on the destruct list, while destruct list-based reclamation is used to reduce memory consumption between restarts, or conversely to allow longer periods of time between restarts without consuming excessive amounts of memory.

Optimizations for Deferred Destruction

Deferred destruction avoids the need for recording transient references to objects. However, it does mean that objects in the memory heap can continue to consume resources longer than if immediate destruction is used. Several refinements are feasible to reduce this cost.

Immediate Termination with Deferred Destruction

It is feasible to have some resources reclaimed in response to a change to the object state itself. For example, an object performing a computation can have some attribute field in the object that can be set to indicate its operating mode. A client (e.g., the user of the object) can then set this attribute to "terminated" to indicate that it should cease the computation and release resources. A procedure associated with this field can be triggered and release the computation resources being used by this object, without this object being destructed. Similarly, locks, open files, network connections, and other resources can be released in response to the same or similar object modification.

In some embodiments, deletion from a parent collection or other collections can be triggered by the setting of the attribute to "terminated" as described above, so the only application action required on the object to trigger this shutdown and reclamation processing is setting the associated attribute to "terminated." This approach is referred to as attribute-based termination.

The attribute-based termination approach allows immediate termination of object activities and certain resource consumption, triggered by writing this attribute. In contrast, if these actions are only performed on destruction, even if destruction is initiated immediately when an object has no references, the actions can be deferred too long by some object retaining a reference to this "terminated" object. It is difficult for the programmer to ensure that all references are removed in a relatively short amount of time. This approach can be provided as part of a general attribute that indicates the operating state of an object, state values including for example, "initializing," "running," and "standby," as well as "terminated." Thus, it does not impose any additional cost when used to indicate immediate resource release, as is the focus here, because support for attribute-based processing is needed in any case. Further, the approach allows other objects to react to this attribute the same as other attributes to remove their references to said object or other relevant processing, thereby recognizing quickly when an object is no longer functional or needed. Using this approach, the actual object destruction has minimal or no application semantics because the only real processing that occurs at that destruction is memory reclamation and dereferencing.

In some embodiments, as an alternative to attribute-based termination, an object can be deleted from some collection causing a procedure to be triggered that recognizes this object change and releases any resources that the object then no longer needs. Such deletion often entails a similar modification to the object itself because the object contains a backpointer to the collection which is cleared on deletion. Local object processing can be triggered on this modification, similar to attribute-based destruction.

Stack-Optimized Data Type Representation

Figure 11A:
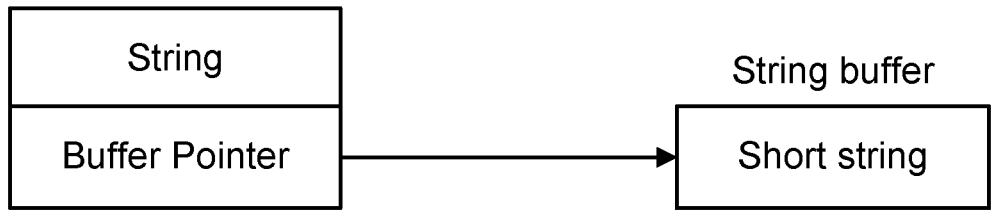
FIG. 11A is a data structure diagram illustrating a common String implementation.

In some embodiments, large or variable-size data types that are normally stored on the stack yet may conventionally be designed to allocate heap memory for this variable-sized data can be designed to minimize the frequency of this heap allocation. For example, FIG. 11A is a data structure diagram illustrating a common String implementation. As shown, the implementation defines the top-level String type that contains a pointer to a variable-sized string buffer that is allocated on the heap, storing the actual bytes in the String. This design accommodates variable-sized strings and also means that a String can be efficiently passed by value without copying the string contents. However, it does mean that each temporary String that is created allocates heap memory that is wasted until the next reclamation point.

Figure 11B:
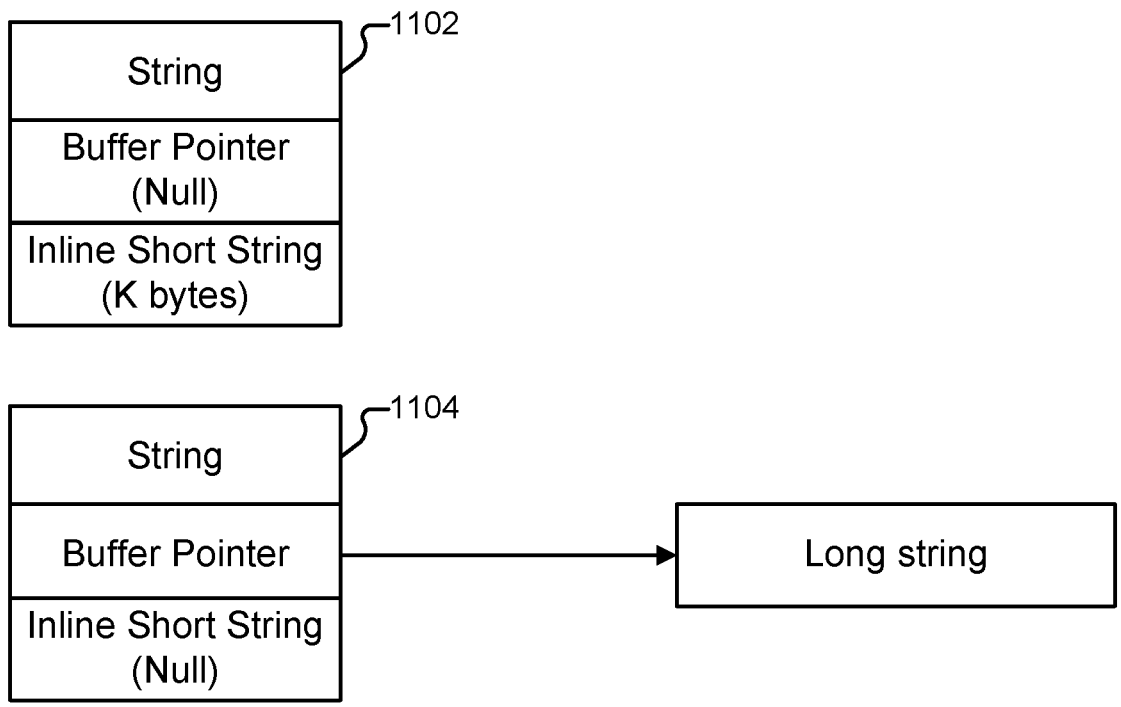
FIG. 11B is a data structure diagram illustrating a different implementation for a String.

FIG. 11B is a data structure diagram illustrating a different implementation for a String. As shown, the top-level type includes an inline string buffer (which is on the stack) of a fixed size of K bytes, where this inline buffer stores the string bytes if the string data is less than or equal to K bytes in length, and no heap allocation is required. The top-level type also includes a buffer pointer to a buffer located on the heap for storing string data greater than K bytes. For example, object 1102's string data, which is shorter than K bytes, is stored in the inline string buffer on the stack. In contrast, object 1104's string data, which is greater than K bytes, is stored in a regular buffer on the heap. In some embodiments, measurements indicate that 80-90% of strings are less than 32 bytes in length. Thus, by setting a K of 32 bytes, 80-90% of temporary strings do not use heap memory and thus do not waste memory between the time they are no longer in scope and the next reclamation point. This approach of expanding a type that is commonly instantiated on the stack so it does not use the heap in the common case is widely applicable. Another example is bitmap, which in a standard implementation is of variable size even though in practice the size of bitmap is relatively small. A stack-based, fixed sized bitmap type can be defined in more efficient alternative implementations.

As a further optimization, there can be separate transient and persistent representations of the same data type, with the former optimized to avoid heap allocation while the latter is optimized for space efficiency and memory heap allocation. For example, in some embodiments, the programming environment (e.g., the programming language, compiler, etc.) supports transient strings of a fixed size allocated on the stack, as well as persistent strings allocated on the heap.

In some embodiments, an escape analysis is performed to convert allocations on the heap to allocations on the stack. Escape analysis is a known technique to determine the dynamic scope of pointers and whether a pointer is on the stack or on the heap. The use of escape analysis can further reduce the wastage of memory between reclamation points. For example, strings allocated on the heap can be converted to strings allocated on the stack if they meet the size requirement.

Specialized Allocators for Internal Objects

In some embodiments, as another optimization, certain internal objects may be allocated and deleted with some frequency. For example, an open file descriptor in a file server is allocated on each file open and deallocated on each file close, and may represent a significant portion of memory allocation/deallocation behaviors. These objects can often be made a fixed size. For these objects, a specialized allocator can be used that effectively maintains a type-specific free list, so an object remains of the specified type even when it is freed; it is still kept in the memory, but is merely inactive.

With this optimization, such an object is placed back on the type-specific free list rather than freed back to the general memory pool provided by the heap. Thus, transient references to this object do not need to be specially handled since the object is not reclaimed. Moreover, in many cases, these ancillary objects are internal to a module that can know of all the possible references. Consequently, these objects can be allocated or activated and released without contributing to the memory that is not reclaimed until the next reclamation point.

In some embodiments, a string implementation can use a specialized allocator for string buffers allocated in the heap, ensuring these are reclaimed efficiently, handling strings that are larger than the inline string buffer.

In some embodiments, non-shared but heap allocated memory that is only used within a given function can be handled with a C++ auto_ptr or similar mechanism that automatically frees the memory, and does not require reference counting (but does require that there is a single reference to the allocated memory).

Scheduling Reclamation

In some embodiments, using destruct list reclamation, a thread can be scheduled to perform the reclamation over time to minimize response time impact on application, or to perform the reclamation when the process is otherwise idle.

In some embodiments, a process maintains a memory reserve pool. When it exhausts its normal memory allocation, it can start using the memory reserve pool to allow it greater flexibility in scheduling the point at which it performs reclamation. For example, on switching to the reserve pool, a process can set a flag indicating this state. Subsequently, if the application reaches a quiescence state when this flag is set, it performs reclamation. In other words, once the reserved pool is reached, the process can perform reclamation as soon as it is ready to do so.

In some embodiments, this reserve pool is implemented as an additional memory allocation threshold that is lower than the absolute limit, allowing the process to react while it is able to continue doing allocation, until a preferred time for reclamation.

In some embodiments, a reclamation scheduler indicates when each process can perform a reclamation, thus avoiding an excessive number of reclamations occurring at the same time and thereby degrading application performance. For example, a process can request to be scheduled when it reaches a "soft" threshold such as starting to use its reserve pool, and then reclaim when the schedule responds with an indication to do so.

Using these techniques described above, deferred destruction can be used while still providing fast response to object "termination" and fast reclamation of resources yet minimizing the amount of memory wasted between reclamation points (because it could potentially be reclaimed but has not been), and minimizing the interference with application performance.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   executing a process that has a plurality of objects, wherein prior to reaching a reclamation point:

at least one object among the plurality of objects has a persistent reference and a transient reference;

the persistent reference is used in determining a reference count of the object; and the transient reference is not used in determining the reference count of the object;

maintaining a destruct list, comprising:

determining whether a persistent reference count of an object on the destruct list is non-zero; and in response to a determination that the persistent reference count of the object on the destruct list is non-zero, deleting the object from the destruct list;

reaching a reclamation point where an object among the plurality of objects either has no transient references, or has one or more transient references only at one or more known locations, wherein reaching the reclamation point is triggered in response to a memory reserve pool being used by the process, and wherein reaching the reclamation point where the object among the plurality of objects either has no transient references, or has one or more transient references only at one or more known locations comprises:

determining that memory usage of the process is equal to or exceeds a threshold; and determining that the reclamation point has been reached;

upon reaching the reclamation point, processing, using the destruct list, objects on the destruct list, comprising:

checking whether there is a transient reference to an object on the destruct list at a known location; and in response to a determination that there is no transient reference to the object at the known location:

determining whether the persistent reference count of the object at the known location is non-zero; and in response to a determination that the persistent reference count of the object at the known location is non-zero, omitting to destruct the object on the destruct list; and in response to setting an attribute of at least one object of the plurality of objects to be terminated, triggering a deletion of the at least one object from a collection.

2. The method of claim 1, wherein maintaining a destruct list comprises:

determining that a persistent reference count of an object of the plurality of objects has reached 0; and adding a reference to the object to the destruct list.

3. The method of claim 1, wherein processing objects on the destruct list comprises removing objects are unreferenced.

4. The method of claim 1, further comprising:

determining whether a reference has been added to an object in the destruct list; and in response to a determination that a reference has been added to the object in the destruct list, removing the referenced object from the destruct list.

5. The method of claim 1, wherein the reclamation point is reached at a barrier that causes a plurality of threads to wait at the barrier, and the method further comprises, at the barrier, removing objects that are unreferenced.

6. The method of claim 1, further comprising performing an escape analysis, and based on a result of the escape analysis, converting an object allocated on a heap to an object allocated on a stack.

7. A system, comprising:

one or more memories to store a plurality of objects of a process; and one or more hardware processors coupled to the one or more memories, to:

execute the process that has the plurality of objects, wherein prior to reaching a reclamation point:

at least one object among the plurality of objects has a persistent reference and a transient reference;

the persistent reference is used in determining a reference count of the object; and the transient reference is not used in determining the reference count of the object;

maintain a destruct list, comprising to:

determine whether a persistent reference count of an object on the destruct list is non-zero; and in response to a determination that the persistent reference count of the object on the destruct list is non-zero, delete the object from the destruct list;

reach a reclamation point where an object among the plurality of objects either has no transient references, or has one or more transient references only at one or more known locations, wherein reaching the reclamation point is triggered in response to a memory reserve pool being used by the process, and wherein reaching the reclamation point where the object among the plurality of objects either has no transient references, or has one or more transient references only at one or more known locations comprises to:

determine that memory usage of the process is equal to or exceeds a threshold; and determine that the reclamation point has been reached; and upon reaching the reclamation point, process, using the destruct list, objects on the destruct list, comprising to:

check whether there is a transient reference to an object on the destruct list at a known location; and in response to a determination that there is no transient reference to the object at the known location:

determining whether the persistent reference count of the object at the known location is non-zero; and in response to a determination that the persistent reference count of the object at the known location is non-zero, omit to destructing the object on the destruct list; and in response to setting an attribute of at least one object of the plurality of objects to be terminated, trigger a deletion of the at least one object from a collection.

8. The system of claim 7, wherein maintaining a destruct list comprises to:

determine that a persistent reference count of an object of the plurality of objects has reached 0; and add a reference to the object to the destruct list.

9. The system of claim 7, wherein processing objects on the destruct list comprises to remove objects in the destruct list.

10. The system of claim 7, the one or more hardware processors are further configured to:

determine whether a reference has been added to an object in the destruct list; and in response to a determination that a reference has been added to the object in the destruct list, remove the referenced object from the destruct list.

11. The system of claim 7, wherein the reclamation point is reached at a barrier that causes a plurality of threads to wait at the barrier, and the hardware processor is further configured to, at the barrier, remove objects that are unreferenced.

12. A computer program product, the computer program product being embodied in a tangible non-transitory computer readable storage medium and comprising computer instructions for:

executing a process that has a plurality of objects, wherein prior to reaching a reclamation point:
        at least one object among the plurality of objects has a persistent reference and a transient reference;
        the persistent reference is used in determining a reference count of the object; and
        the transient reference is not used in determining the reference count of the object;
    maintaining a destruct list, comprising:
        determining whether a persistent reference count of an object on the destruct list is non-zero; and
        in response to a determination that the persistent reference count of the object on the destruct list is non-zero, deleting the object from the destruct list;
    reaching a reclamation point where an object among the plurality of objects either has no transient references, or has one or more transient references only at one or more known locations, wherein reaching the reclamation point is triggered in response to a memory reserve pool being used by the process, and wherein reaching the reclamation point where the object among the plurality of objects either has no transient references, or has one or more transient references only at one or more known locations comprises:
        determining that memory usage of the process is equal to or exceeds a threshold; and
        determining that the reclamation point has been reached; and
    upon reaching the reclamation point, processing, using the destruct list, objects on the destruct list, comprising:
        checking whether there is a transient reference to an object on the destruct list at a known location; and
        in response to a determination that there is no transient reference to the object at the known location:
            determining whether the persistent reference count of the object at the known location is non-zero; and
            in response to a determination that the persistent reference count of the object at the known location is non-zero, omitting to destruct the object on the destruct list; and
    in response to setting an attribute of at least one object of the plurality of objects to be terminated, triggering a deletion of the at least one object from a collection.

13. The computer program product of claim 12, wherein maintaining a destruct list comprises:
    determining that a persistent reference count of an object of the plurality of objects has reached 0; and
    adding a reference to the object to the destruct list.

14. The computer program product of claim 12, wherein processing objects on the destruct list comprises removing objects in the destruct list.

15. The computer program product of claim 12, further comprising computer instructions for:
    determining whether a reference has been added to an object in the destruct list; and
    in response to a determination that a reference has been added to the object in the destruct list, removing the referenced object from the destruct list.

16. The computer program product of claim 12, wherein the reclamation point is reached at a barrier that causes a plurality of threads to wait at the barrier, and further comprises comprising computer instructions for, at the barrier, removing objects that are unreferenced.

\* \* \* \* \*

UNITED STATES PATENT AND TRADEMARK OFFICE
CERTIFICATE OF CORRECTION

| | | |
|---|---|---|
| PATENT NO. | : 11,232,026 B2 | Page 1 of 1 |
| APPLICATION NO. | : 16/509259 | |
| DATED | : January 25, 2022 | |
| INVENTOR(S) | : David R. Cheriton | |

It is certified that error appears in the above-identified patent and that said Letters Patent is hereby corrected as shown below:

On the Title Page

In page 2, Column 1, item (56), U.S. patent documents, Line 10, delete "Traversal" and insert --Traversat--, therefor.

Signed and Sealed this
Fourteenth Day of June, 2022

*Katherine Kelly Vidal*

Katherine Kelly Vidal
*Director of the United States Patent and Trademark Office*